US005799253A

United States Patent [19]

Pedersen et al.

[11] Patent Number: 5,799,253
[45] Date of Patent: Aug. 25, 1998

[54] METHOD OF SWITCHING IN A SIGNAL SELECTING SYSTEM

[75] Inventors: Kristian Pedersen; Tommy Hjordt, both of Copenhagen; Keld Andersen, Vanloese, all of Denmark

[73] Assignee: Motorola, Inc., Schaumburg, Ill.

[21] Appl. No.: 621,413

[22] Filed: Mar. 25, 1996

[30] Foreign Application Priority Data

Apr. 3, 1995 [GB] United Kingdom ............ 9506873

[51] Int. Cl.$^6$ ...................................... H04Q 7/30
[52] U.S. Cl. ................ 455/527; 455/445; 340/825.51; 370/465; 370/537
[58] Field of Search ......................... 455/527, 528, 455/31.1, 31.2, 424, 445, 561; 370/462, 465, 529, 528, 537, 300; 340/825.5, 825.51

[56] References Cited

U.S. PATENT DOCUMENTS

| 4,500,987 | 2/1985 | Hasegewa | 370/462 |
| 4,707,693 | 11/1987 | Hessel | 340/825.51 |
| 5,343,473 | 8/1994 | Cidon et al. | 370/465 |
| 5,557,608 | 9/1996 | Calvignac et al. | 370/426 |

FOREIGN PATENT DOCUMENTS

| 2180125A | 3/1987 | United Kingdom | H04L 1/16 |
| 2187917A | 9/1987 | United Kingdom | H04L 11/16 |

*Primary Examiner*—Nguyen Vo
*Assistant Examiner*—Lee Nguyen
*Attorney, Agent, or Firm*—Daniel C. Crilly

[57] ABSTRACT

A signal selecting system comparator (25) employs a method of switching selected first (40) and second (41) input ports to an output port (43). A block divided first signal (A) is received at the first input (40), buffered and passed to the output (43) as a block divided output signal (E). A block divided second signal (C) is received at the second input. The system waits to the next occurrence of a block boundary in the block divided output signal, identifies that the signal at the second input has priority in routing to the output; and passes the second signal to the output.

9 Claims, 5 Drawing Sheets

5,799,253

METHOD OF SWITCHING IN A SIGNAL SELECTING SYSTEM

FIELD OF THE INVENTION

This invention relates to a method of switching in a signal selecting system. An example of such a system, without limitation thereto, is a comparator of a private mobile radio system.

BACKGROUND OF THE INVENTION

In "conventional" (i.e. non-trunked) wide area radio systems, it is usual to employ a comparator, that is to say a signal selecting and switching device. In an analog system, for example, a Motorola-brand SPECTRATAC comparator can be used to switch between one of a number of base stations and a console for dispatch communication between a controller and mobile radios in the field. The comparator performs voting, selection and emergency pre-emption.

With the development of digital communication, voice and data communication takes place in block divided signals, where each block includes voice coding and/or error correction and a complete block must be buffered and communicated from end-to-end for any portion of the block to be usable at the destination. This requires buffering of the data which introduces a degree of delay. Delay in the communication is inconvenient and irritating to the user and must be kept at a minimum.

A feature of a digital comparator is the resumption of a communication that has previously been interrupted through pre-emption by a higher priority communication, or that has commenced but has not been selected due to an on-going higher priority signal. Digital comparators employ buffering of the signal in preparation for its resumption.

Methods of switching in existing digital comparators introduce unacceptably long delays, particularly where multiple or repeated pre-emptions and/or resumptions give rise to extensive buffering in particular situations. Therefore, there is a need for an improved method of switching in a signal selecting system.

SUMMARY OF THE INVENTION

According to the present invention, a method is provided of switching selected first and second inputs to an output in a signal selecting system. The method comprises the steps of receiving a block divided first signal at the first input, buffering it and passing it to the output as a block divided output signal; receiving a block divided second signal at the second input; waiting to the next occurrence of a block boundary in the block divided output signal; identifying that the signal at the second input has priority in routing to the output; and passing the second signal to the output.

By waiting until the next occurrence of the block boundary in the block divided output signal before determining the priority of routing to the output, situations are avoided during pre-emption where incorrect or premature priority decisions are taken and situations are avoided during resumption where lengthy buffers are built up.

A preferred embodiment of the invention is now described, by way of example only, with reference to the drawings.

| Glossary of Terms | |
|---|---|
| CIM | Console Interface Module |
| BIM | Base Station Interface Module |
| CEB | Centralized Station Interface Module |
| CSDM | Comparator Status Display Module |
| DCCM | Display Channel Control Module |
| DIU | Digital Interface Unit |
| HDLC | High Level Data Link Control |
| LDU | Link Data Unit |
| STIM | Status Interface Module |
| TDM | Time Division Multiplex |
| VSELP | Variable Slope Excitation Linear Prediction |

DESCRIPTION OF A PREFERRED EMBODIMENT

Figure 1:
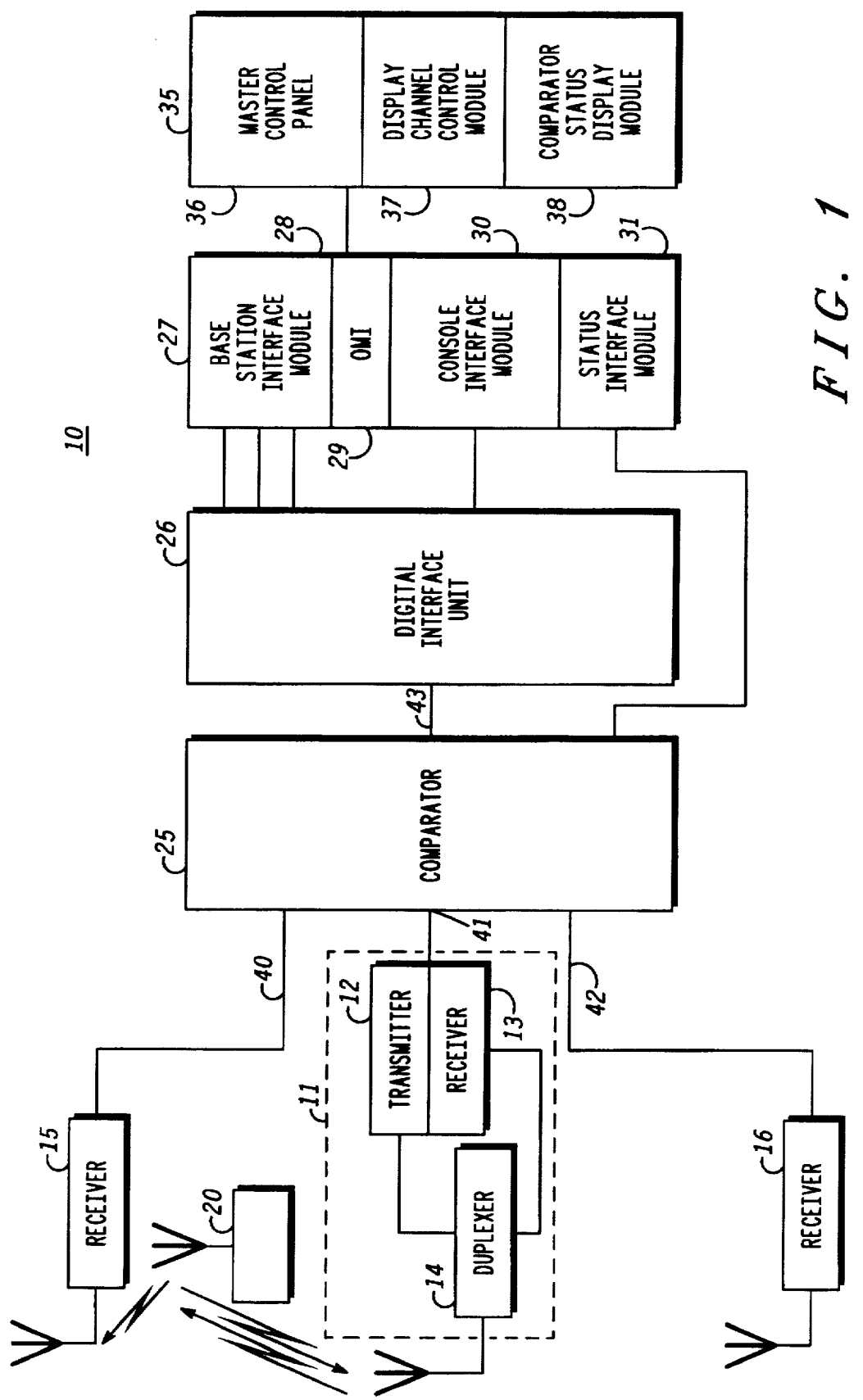
FIG. 1 shows, a block diagram of a signal selecting system in accordance with a preferred embodiment of the invention.

FIG. 1 is an overall block diagram of a radio communications system having a signal selecting system. The radio system is a wide area system and is a "conventional" system in the sense that it is not a trunked radio system, i.e. it does not have a central trunking controller.

The radio system 10 comprises a transceiving base station 11 (having a transmitting part 12, a receiving part 13 and a duplexer 14) and remote or "satellite" receivers 15 and 16.

An arrangement of this nature provides wide area coverage when compared with a single base station system, in that the receivers 15 and 16 are able to receive signals from a mobile radio 20 when the mobile radio 20 is in remote areas of coverage. The uplink signal transmitted by the mobile radio 20 is generally weaker than the downlink signal transmitted by the base station 11, so that, while the base station 11 is able to transmit to the entire coverage area of the system, it is not necessarily able to receive the weaker signal transmitted by the mobile radio 20 from outlying areas of coverage. The receivers 15 and 16 enable reception from the mobile radio 20 in these outlying areas.

It will, of course, be understood that base stations in addition to base station 11 can be included in the system, as well as receivers in addition to receivers 15 and 16.

The system 10 further comprises a comparator 25. The term "comparator" is used in the art of private mobile radio to refer to a signal selecting and switching device.

The comparator 25 has a number of ports, of which four are shown (ports 40–43). Port 43 is connected to a digital interface unit 26 which is in turn connected to a CEB 27. The CEB 27 comprises a BIM 28, an OMI 29, an CIM 30, such as the "ASTRO" CIM manufactured by Motorola, Inc. and STIM 31. The CEB 27 is connected to a console 35 which comprises a master control panel 36, a DCCM 37 and a CSDM 38. Ports 40, 41 and 42 of the comparator 25 are connected to receiver 15, base station 11 and receiver 16, respectively.

Some of the elements shown in FIG. 1 are optional. For example, not all systems include console 35.

In operation, the comparator 25 receives signals from the receivers 15 and 16; the base station 11 and the DIU 26; and it sends signals to the base station 11 and the DIU 26.

The comparator 25 sets up an uplink channel for passing signals from the receivers 15 and 16 or the base station 11 to the DIU 26 and it sets up a downlink channel for passing signals from the DIU 26 or from one of the receivers 15 or 16 to the base station 11 for transmission by the transmitter part 12.

The comparator 25 compares received signals from the base station 11 and from the receivers 15 and 16 and selects one of these signals for passing, i.e. routing, to the console 35.

It may be noted that variations in the comparator can be made which allow for diversity combining of different signals from the receivers 15 and 16 and the base station 11, but for the present purposes the simple case of selecting between different incoming signals to the comparator 25 will be considered.

Figure 2:
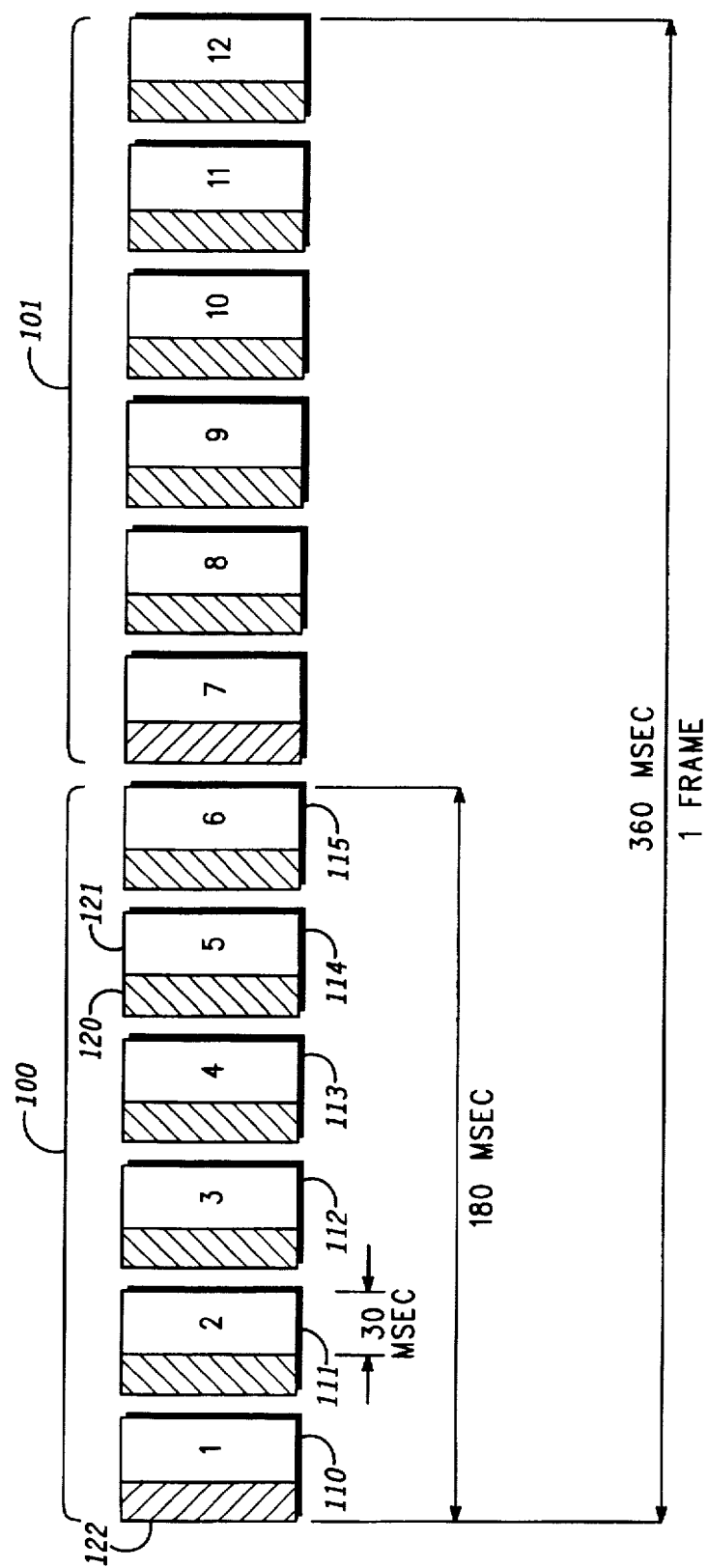
FIG. 2 is a timing diagram illustrating the frame structure for transfer of link data units in the system of FIG. 1.

Referring to FIG. 2, uplink and downlink signals passing through the comparator 25 are passed as data blocks, called link data units (LDUs). FIG. 2 shows two LDUs 100 and 101, which together form a single frame of data. Each LDU has a duration of 180 millisecondes. The frame has a duration of 360 msec. Each LDU comprises 6 segments 110–115 of coded voice. An example of voice coding is VSELP coding. Each segment 110–115 comprises an embedded signalling part 120 and a data part 121. The embedded signalling part of the first segment 110 contains a synchronising pattern and a network ID 122. The remaining embedded signalling for the other segments of the first LDU 100 contains link control information. In the second LDU 101 of the frame, frame encryption and signalling is sent.

This frame structure allows continuous re-entry (every 180 msec), continuous ID (every 360 msec), continuous encryption synchronisation (every 360 msec), enhanced signalling, embedded signalling (available every 360 msec), signalling without voice truncation and received unit ID display (refreshed every 360 msec).

Due to the block structure of the signals, it is not possible to interrupt the signal at any time. Signals can only be interrupted at block boundaries. Thus, for example, uplink and downlink signals passing through the comparator 25 are buffered, so that complete blocks can be passed uplink or downlink. Buffering of the data introduces a degree of delay, which must be kept at a minimum.

Pre-emption is a process performed by the comparator 25, whereby a signal (such as an uplink signal from receiver 16), is identified by the comparator 25 as being of higher priority than an existing ongoing signal (for example a signal from receiver 15), such that the existing ongoing signal needs to be interrupted in favour of passing the higher priority signal from the receiver 16 to the console 35. Note that the signal from the receiver 16 may instead, or in addition, be routed to the base station 11 to be repeated, i.e. retransmitted.

In the downlink direction, signals from the DIU 26 are routed to the base station 11 for transmission. Signals from the DIU have higher priority than signals from mobile radios, such as mobile radio 20. The taking over of a channel between the DIU and/or the various receivers and/or the base station is referred to as "pre-emption".

After a higher priority signal has caused pre-emption and that signal has been completed, a process referred to as "resumption" occurs, in which a channel through the comparator 25 is assigned to the previous lower priority signal, which was ongoing before the pre-emption. Resumption can also occur without earlier pre-emption, in a case where the signal to be resumed is of lower priority and commenced after commencement of a higher priority signal.

The process of selecting a signal for pre-emption or resumption may be referred to as "arbitration".

Figure 3:
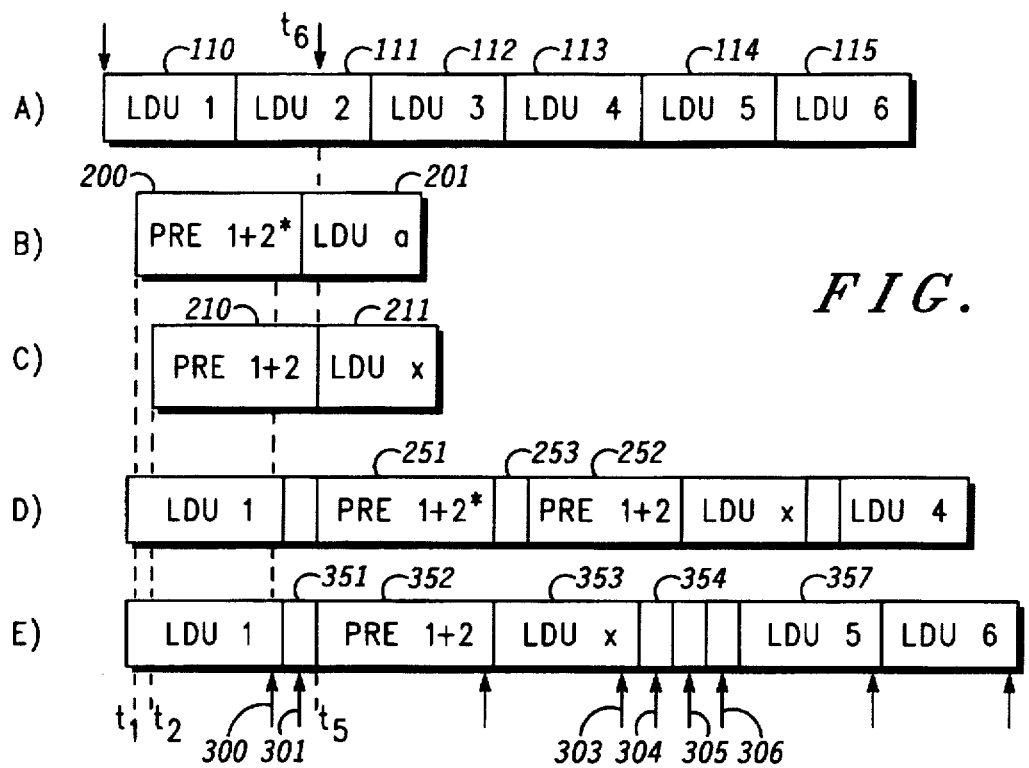
FIG. 3 illustrates various scenarios in operation of a prior art selecting system and a selecting system in accordance with the preferred embodiment of the invention, illustrating features of pre-emption operation.

Referring to FIG. 3, five signals are shown labelled A, B, C, D, and E. Signals A, B and C are arriving at different ports (such as ports 40, 41, 42) of the comparator 25 from different receivers 15, 13 and 16 (for example) in the uplink direction. Signal D illustrates the manner in which a prior art comparator has previously presented these different signals at the output port 43 of the comparator 25.

Signal E represents the selection and presentation of the different signals A, B, C at the output port 43 of a comparator in accordance with the present invention.

Inbound and outbound arbitration points are shown in FIG. 3. An inbound arbitration point exists where the beginning of an LDU arrives at the comparator 25. An outbound arbitration point is a new feature and exists at a predetermined time in advance of an LDU being sent out from the comparator 25. The predetermined time is sufficient for a selecting decision to be taken and for switching and buffer control operations to be carried out.

Signal A shows different LDUs 110–115 (labelled LDU1, LDU2 . . . LDU6) of an inbound frame from receiver 15. Signal B shows that, at a time t1 after commencement of LDU 110, a new signal is received at port 41 and the new signal has a preamble LDU 200, followed by a series of LDUs 201 etc. (labelled LDU a). Preamble 200 contains an ID which in this case is 2*. The ID 2* is recognised by comparator 25 as being of higher priority than the ID of the existing signal received at port 40.

At time t2, after t1, a third signal C is received at port 42, having the preamble LDU 210, containing the ID 2, followed by LDUs 211 etc. (labelled LDU x).

Previous block based comparator arrangements have handled a pre-emption scenario as shown by signal D (a signal to be sent to a base station). As can be seen, the arrival of higher priority preamble LDU 200 causes a pre-emption. This LDU is buffered and, at time t5, it is presented at the output. Reception of the LDU 210 of signal C again causes preemption, because it has priority higher than signal B and the preamble LDU of signal C is presented at the output in output LDU 252, after output LDU 251 is completed. At each pre-emption an empty partial block 253 (a "dummy block") is inserted at the output to indicate a source change. The buffering and outputting of LDU 251 causes delay in outputting of signal C, which is unwanted and causes unnecessary building up of buffers.

Referring to signal E shown in FIG. 3, an improved manner of handling pre-emption is illustrated, in which outbound arbitration points are illustrated at the bottom of the figure, each outbound arbitration point occurring just before the end of an LDU or a dummy LDU, at a predetermined time in advance of the block boundary. At arbitration point 300, the comparator 25 is able to identify that signal B is present with a priority higher than the priority of the existing signal A. Thus, pre-emption is necessary and the comparator 25 causes a dummy block 351 to be inserted.

At arbitration point 301, immediately before the completion of dummy block 351, another comparison is made, and it is identified that the highest priority signal at this time is signal C. Thus, LDU 210 is presented at the output as output LDU 352. Medium priority LDU 200 is avoided completely. Immediately following LDU 352 comes the rest of the signal C in LDU 353. Considering the case where LDU 353 is the end of signal C, an arbitration point 303 exists, at which comparator 25 considers the next LDU for transmission. LDU 113 of signal A is incomplete, so the comparator 25 inserts two more dummy blocks into the output signal E. Arbitration occurs at each of points 304 and 305, but it is not until arbitration point 306 that a new input LDU has commenced (LDU 114). This LDU is buffered and immediately output as output LDU 357, followed by any subsequent LDUs of signal A. It can be noted that there is a very small delay (a fraction of one LDU) between inputting of LDU 114 and outputting of LDU 357.

Thus there has been described an improved method of handling pre-emptions.

When performing pre-emptions in a digital comparator, the building up of delays cannot be avoided. Due to this, there is a risk of buffer overflow in the system in a case of multiple pre-emptions during a session. To avoid buffer overflow, it is advantageous to empty the buffer (reduce the delay) at each resumption.

Figure 4:
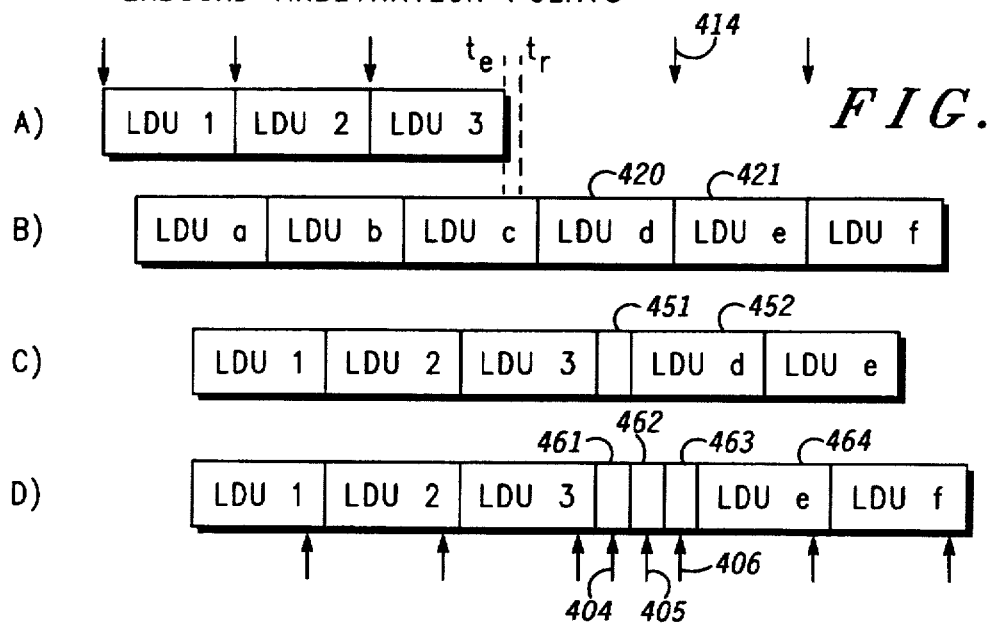
FIG. 4 is a timing diagram illustrating operation of a prior art selecting system and a selecting system in accordance with the preferred embodiment of the invention, illustrating features of resumption operation.

Referring to FIG. 4, different resumption scenarios are illustrated. Signals A and B are different signals at inputs to the comparator 25. Signal A is a higher priority signal that has caused pre-emption over signal B. Signal A ends at time $t_e$.

Signal C illustrates the operation in a prior art comparator. In the prior art comparator, resumptions are performed when the original session ends on the inbound channel and immediately an arbitration point in the session is sought in order to resume. This occurrence at time $t_r$, which is the start of LDU 420 of signal B. In the outbound signal C a dummy block 451 is inserted, followed by outbound LDU 452, which contains the data of inbound LDU 420. As can be seen, there is a substantial delay between inbound LDU 420 and outbound LDU 452.

In accordance with the preferred embodiment of the present invention, comparator 25 predicts the time at which the last LDU of the original session is sent from the comparator and waits until that time (or more specifically a predetermined time in advance of that time) before looking for an arbitration point in the session. During the time from the original session ending on the inbound port, until looking for an arbitration point in a new session, the buffers in the system are emptied and the delays reduced. In the outbound signal D, dummy blocks 461, 462 and 463 are inserted and at arbitration points 404, 405 and 406, arbitration is carried out. At arbitration point 405, there has been no new LDU boundary in inbound C or B and resumption is declined. At arbitration point 406, a new inbound LDU (LDU 421) is received and buffering of that LDU is commenced and at the completion of dummy block 463, LDU 421 can be output as outbound LDU 464, thus giving minimum delay between the inbound LDU 421 and the outbound LDU 464.

In summary, when signal A of FIG. 4 stops, the comparator 25 waits until the next outbound arbitration point and then waits until the next inbound arbitration point (point 414) before starts routing the resumed signal B. This handling of the signals allows the buffers to be emptied and the throughput delay is reduced. The first possible LDU (420) of the resuming signal is not routed to the output.

Figure 5:
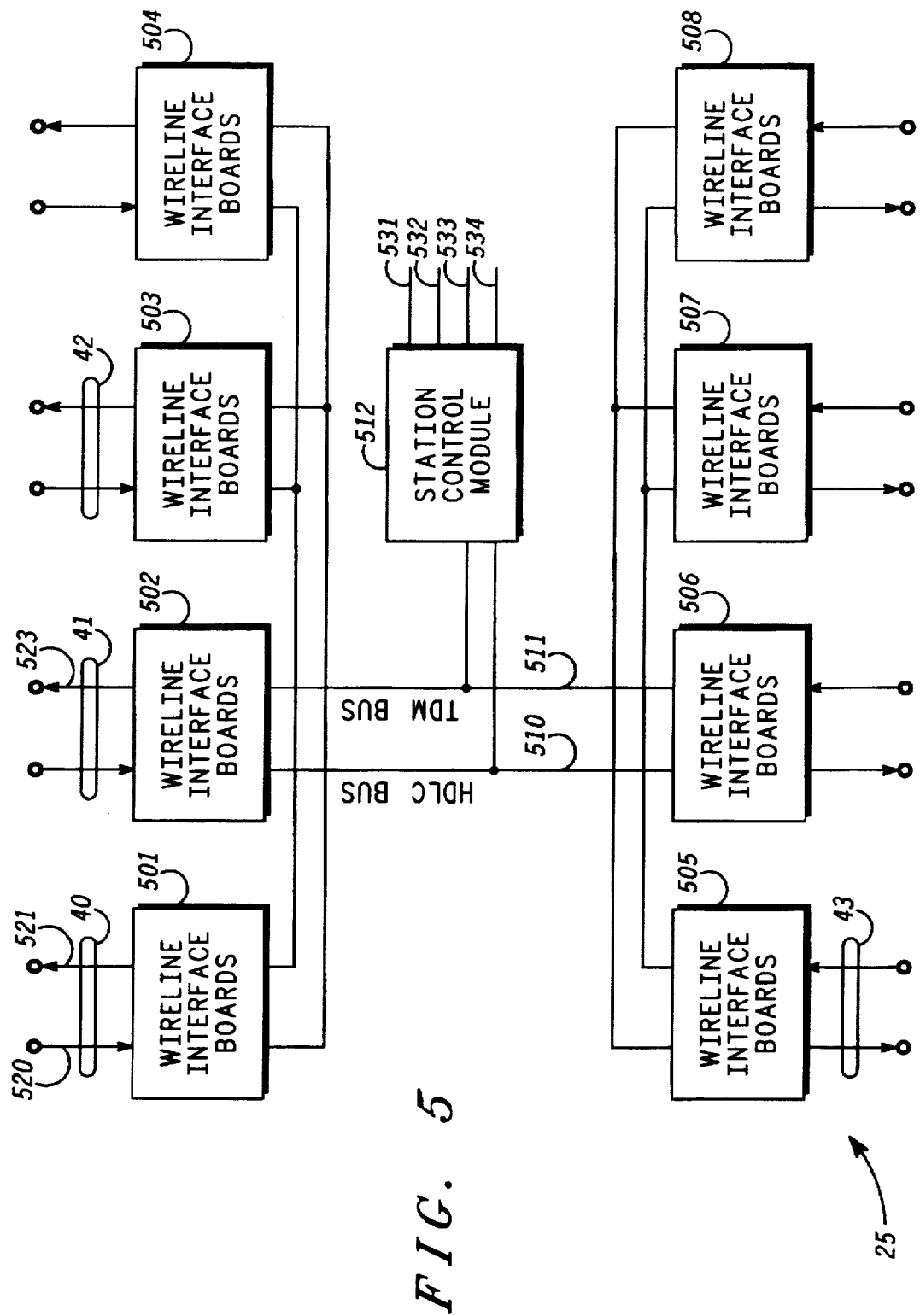
FIG. 5 is a block diagram illustrating the construction of the comparator of FIG. 1 in greater detail.

Referring to FIG. 5, details of the comparator 25 are shown. It is seen that the comparator 25 comprises 8 wireline interface boards 501–508. One of these wireline interface boards, e.g. board 505, is connected to the DIU 26 via port 43. One of the wireline interface boards is connected to each of the base station 11, the receiver 15 and the receiver 16 (e.g. boards 501, 502 and 503 respectively) via their respective ports 40, 41, 42. The other wireline boards 504 and 505–508 are surplus to the system illustrated in FIG. 1, but can be used for system expansion. Connected to the wireline interface boards 501–508 via an HDLC bus 510 and a TDM bus 511 is a station control module 512. Each wireline interface board, e.g. board 501, has an input line 520 and an output line 521, for uplink and downlink traffic respectively. In this example, output line 521 is unused, because port 40 is connected to a receiver (receiver 15).

Digital analog traffic is communicated between wireline interface boards over the TDM bus 511. Digital encoded voice, plus control information for control of the wireline interface boards is conducted via the HDLC bus. The station control module 512 has the following inputs or outputs: RSS terminal 531, external speaker output 532, local speaker output 533 and handset connection 534.

In operation, signals received by the comparator 25 are received at a wireline interface board input, e.g. input 520 and are sent to the station control module 512 via the HDLC bus 510.

The station control module 512 performs selecting between signals from different receivers, according to known criteria. One such criterion is relative bit error rate. The bit error rates of the various uplink signals are compared to identify the best possible signal. Another feature is the provision of signalling in each signal, which includes signal priority information. Different signal priority values of different inbound signals are compared and the highest priority signal is identified.

The station control module 512 performs the routing of signals. The "selected" signal is routed back to the selected wireline interface board for onward communication (the particular board depending upon the direction of the communication and whether the signal is being repeated by the base station 11 or is being passed from the mobile radio 20 to the console 35 etc.). At the destination wireline interface board, e.g. board 502, the signal is buffered until the station control module 512 instructs it to be sent out on the output line, e.g. line 523.

In the case of pre-emption, the station control module 512 instructs the wireline interface board 502 to output the contents of its buffer, if those contents are a higher priority signal, upon the occurrence of the next outbound arbitration point following identification that the signal to be output is indeed the highest priority signal.

In the case of resumption, the station control module 512 instructs the wireline interface board 502 to output the contents of its buffer at the occurrence of the next outbound arbitration point following an inbound arbitration point at which the decision to resume is taken.

The station control module 512 initiates the outputting of dummy blocks by instructing the wireline interface board, e.g. board 502, to empty its buffer, followed by instructing the wireline interface board 502 to output a dummy block. This instruction is sent over the HDLC bus 510.

Figure 6:
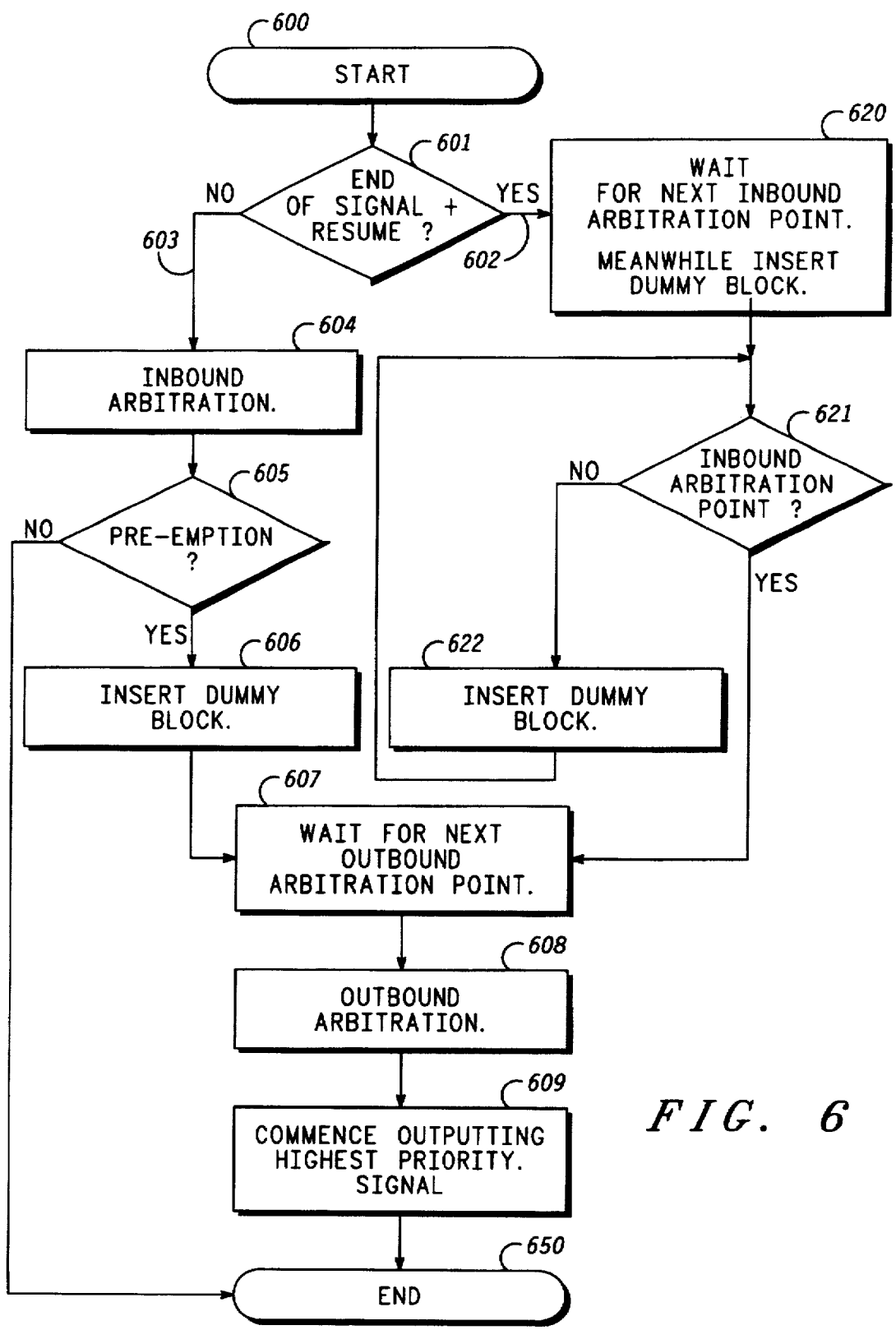
FIG. 6 is a flow diagram illustrating operation of the signal selecting system of FIG. 5.

A program for operating the comparator 25 of FIG. 5 is illustrated by way of example in FIG. 6.

A continuous program is executed starting at step 600. The program is run after each LDU sent out from the comparator 25. Step 601 determines whether the current selected signal is ending while a previously pre-empted signal is still coming in to the comparator. If the result is "yes", the program proceeds to resumption branch 602, otherwise it proceeds to pre-emption branch 603. In each case there exists a received block-divided first signal at a first input (e.g. port 40), which is buffered in interface board 501 and is being passed to output port 43 as a block divided output signal.

The case will be considered where a block divided second signal is received at a second input, e.g. input port 41.

In step 604, arbitration is carried out at an inbound arbitration point. If there is no pre-emption in the last LDU, e.g. there is no second signal or the second signal is lower in priority, step 605 jumps to the end (step 650).

In step 606 a partial block is inserted (indicating a change of source) and in step 607, the program waits for the next outbound arbitration point, i.e. the next occurrence of a block boundary in the block divided output signal.

In outbound arbitration step 608, the program identifies that the signal at the second input has priority in routing to the output and performs the pre-emption or resumption by changing to the new high priority signal and in step 609 the second signal is passed to the output.

In the case of pre-emption as described, passing of the first signal to the output is terminated at the occurrence of a block boundary in the block divided output signal prior to step 606.

If step 601 identifies that the block divided first signal has ended, the program passes to step 620 and it inserts a dummy block (e.g. dummy block 461 of FIG. 4). In this case a previously pre-empted signal now to be resumed can be considered as the block divided second signal. If the next occurrence of a block boundary in the second signal occurs during the inserted dummy block, step 621 causes the program to pass immediately to step 607. Otherwise, steps 621 and 622 cause repeated dummy blocks to be inserted until the next inbound arbitration point.

In step 607, the program waits to the next occurrence of a block boundary in the block divided output signal (i.e. just before the end of the current dummy block) and performs a final arbitration in step 608 (in case there is a new higher priority signal in the meantime) and commences outputting of the second (the resumed) signal in step 609.

The flow diagram of FIG. 6 is given by way of example and can be reordered or reconfigured by one skilled in the art.

We claim:

1. A method of switching selected first and second inputs to an output in a signal selecting system, comprising:

receiving a block divided first signal at the first input, buffering it and passing it to the output as a block divided output signal;

receiving a block divided second signal at the second input;

waiting to the next occurrence of a block boundary in the block divided output signal;

identifying that the signal at the second input has priority in routing to the output;

waiting for an outbound arbitration time which is a predetermined time in advance of a block boundary in the block divided output signal;

comparing at the outbound arbitration time priorities of the block divided signals at the first and second inputs; and passing the second signal to the output.

2. A method according to claim 1 further comprising the step of terminating passing of the first signal to the output at the occurrence of a block boundary in the block divided output signal.

3. A method according to claim 1 further comprising the steps of:

receiving signalling included in the first signal which includes first signal priority information;

receiving signalling included in the second signal which includes second signal priority information; and comparing the first signal priority information with the second signal priority information and performing the step of identifying as a result of the step of comparing.

4. A method according to claim 1, further comprising the step of outputting at least one partial block at the output between a block of the block divided first signal and a block of the block divided second signal.

5. A method according to claim 4, wherein the step of waiting for an outbound arbitration time includes waiting until a predetermined time in advance of a block boundary in the block divided output signal representing the end of a partial block.

6. A method according to claim 1, further comprising the step, prior to the step of waiting to the next occurrence of a block boundary in the block divided output signal, of identifying that the block divided first signal has ended.

7. A method according to claim 6, further comprising the prior step of interrupting passing of the second signal to the output, wherein the step of passing the second signal to the output comprises resuming passing of the second signal to the output.

8. A method according to claim 6, comprising the step of outputting at least one partial block at the output between a block of the block divided first signal and a block of the block divided second signal.

9. A method according to claim 8, wherein the step of outputting at least one partial block further comprise outputting repeated partial blocks until the next occurrence of a block boundary in the block divided second signal at the second input.

* * * * *